US012082060B2

(12) United States Patent
Jeong et al.

(10) Patent No.: US 12,082,060 B2
(45) Date of Patent: Sep. 3, 2024

(54) METHOD AND APPARATUS FOR SIB BASED CELL CHANGES IN A WIRELESS COMMUNICATION SYSTEM

(71) Applicant: Samsung Electronics Co., Ltd., Suwon-si (KR)

(72) Inventors: Kyeongin Jeong, Allen, TX (US); Nishithkumar D. Tripathi, Parker, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 523 days.

(21) Appl. No.: 17/477,407

(22) Filed: Sep. 16, 2021

(65) Prior Publication Data

US 2022/0104083 A1 Mar. 31, 2022

Related U.S. Application Data

(60) Provisional application No. 63/123,245, filed on Dec. 9, 2020, provisional application No. 63/083,583, filed on Sep. 25, 2020.

(51) Int. Cl.
*H04W 36/00* (2009.01)
*H04W 36/08* (2009.01)
(Continued)

(52) U.S. Cl.
CPC ..... *H04W 36/00835* (2018.08); *H04W 36/08* (2013.01); *H04W 36/24* (2013.01); *H04W 48/16* (2013.01)

(58) Field of Classification Search
CPC .......... H04W 36/00835; H04W 36/08; H04W 36/24; H04W 48/16; H04W 48/12;
(Continued)

(56) References Cited

U.S. PATENT DOCUMENTS

2019/0245614 A1 8/2019 Lucky et al.
2020/0178135 A1* 6/2020 Yun ................... H04B 7/18541
(Continued)

FOREIGN PATENT DOCUMENTS

WO 2019193891 A1 10/2019
WO 2019201810 A1 10/2019

OTHER PUBLICATIONS

International Search Report issued Dec. 29, 2021 regarding Application No. PCT/KR2021/013065, 3 pages.
(Continued)

*Primary Examiner* — Marcos Batista

(57) ABSTRACT

Methods and apparatuses in a wireless communication system. A method of a UE comprises: receiving, from a base station (BS) in a non-terrestrial network (NTN), a system information block (SIB); determining that the SIB includes first neighboring cell information and first timing information associated therewith; determining that a first neighboring cell is not a candidate cell for a cell selection or re-selection operation when a current time is before or equal to a time indicated by the first timing information; and determining that the first neighboring cell is a candidate cell for the cell selection or re-selection operation when the current time is after the time indicated by the first timing information.

20 Claims, 10 Drawing Sheets

(51) Int. Cl.
   *H04W 36/24*   (2009.01)
   *H04W 48/16*   (2009.01)
(58) Field of Classification Search
   CPC .............. H04W 84/06; H04W 36/249; H04W 36/0072; H04W 48/08; H04W 48/20; H04B 7/1851; H04B 7/18541
   USPC .................................. 455/436, 437; 370/338
   See application file for complete search history.

(56) References Cited

U.S. PATENT DOCUMENTS

| | | | |
|---|---|---|---|
| 2021/0099933 | A1 | 4/2021 | Matsuda et al. |
| 2021/0144612 | A1 | 5/2021 | Wei et al. |

OTHER PUBLICATIONS

ZTE Corporation et al., "Consideration on system information update in NTN", 3GPP TSG-RAN WG2 Meeting#107, R2-1909264, Aug. 2019, 5 pages.

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.

"5G; NR; Radio Resource Control (RRC); Protocol specification (3GPP TS 38.331 version 16.2.0 Release 16)", ETSI TS 138 331 V16.2.0, Nov. 2020, 908 pages.

"5G; NR; User Equipment (UE) procedures in idle mode and in RRC Inactive state (3GPP TS 38.304 version 16.2.0 Release 16)", ETSI TS 138 304 V16.2.0, Nov. 2020, 41 pages.

Extended European Search Report issued Jan. 19, 2024 regarding Application No. 21872957.2, 13 pages.

Nomor Research GmbH, "System Information in NTN", 3GPP TSG-RAN WG2 Meeting #108, R2-1915543, Nov. 2019, 6 pages.

Hughes, "Satellite Ephemeris Data and their Use for Handover Decisions between Satellites", 3GPP TSG RAN2 Meeting #104, R2-1818050, Nov. 2018, 5 pages.

LG Electronics Inc., "Report on email discussion [107#64][NTN] Cell Selection & reselection", 3GPP TSG-RAN WG2 Meeting #107bis, R2-1913953, Oct. 2019, 21 pages.

* cited by examiner

METHOD AND APPARATUS FOR SIB BASED CELL CHANGES IN A WIRELESS COMMUNICATION SYSTEM

CROSS-REFERENCE TO RELATED APPLICATIONS AND CLAIM OF PRIORITY

The present application claims priority to U.S. Provisional Patent Application No. 63/083,583, filed on Sep. 25, 2020, and U.S. Provisional Patent Application No. 63/123,245, filed on Dec. 9, 2020. The content of the above-identified patent document is incorporated herein by reference.

TECHNICAL FIELD

The present disclosure relates generally to wireless communication systems and, more specifically, the present disclosure relates to system information block (SIB) based cell changes in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to SIB based cell changes in a wireless communication system.

In one embodiment, a user equipment (UE) is provided. The UE comprises a transceiver configured to receive, from a base station (BS) in a non-terrestrial network (NTN), an SIB. The UE further comprises a processor operably coupled to the transceiver, the processor configured to: determine that the SIB includes first neighboring cell information and first timing information associated therewith; determine that a first neighboring cell is not a candidate cell for a cell selection or re-selection operation when a current time is before or equal to a time indicated by the first timing information; and determine that the first neighboring cell is a candidate cell for the cell selection or re-selection operation when the current time is after the time indicated by the first timing information.

In another embodiment, a method of a UE is provided. The method comprises: receiving, from a BS in an NTN, an SIB; determining that the SIB includes first neighboring cell information and first timing information associated therewith; determining that a first neighboring cell is not a candidate cell for a cell selection or re-selection operation when a current time is before or equal to a time indicated by the first timing information; and determining that the first neighboring cell is a candidate cell for the cell selection or re-selection operation when the current time is after the time indicated by the first timing information.

In yet another embodiment, a BS in an NTN is provided. The BS comprises a processor configured to generate an SIB including first neighboring cell information and first timing information associated therewith. The BS further comprises a transceiver operably coupled to the processor, the transceiver configured to transmit, to a UE, the SIB, wherein: a first neighboring cell is not determined as a candidate cell for a cell selection or re-selection operation when a current time is before or equal to a time indicated by the first timing information; and the first neighboring cell is determined as a candidate cell for the cell selection or re-selection operation when the current time is after the time indicated by the first timing information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.821, v.16.0.0, "Solutions for NR to support non-terrestrial networks (NTN)"; 3GPP TS 38.331v.16.2.0, "Radio Resource Control (RRC) protocol specification"; and 3GPP TS 38.304 v.16.2.0, "User Equipment (UE) procedures in Idle mode and RRC."

Figure 1:
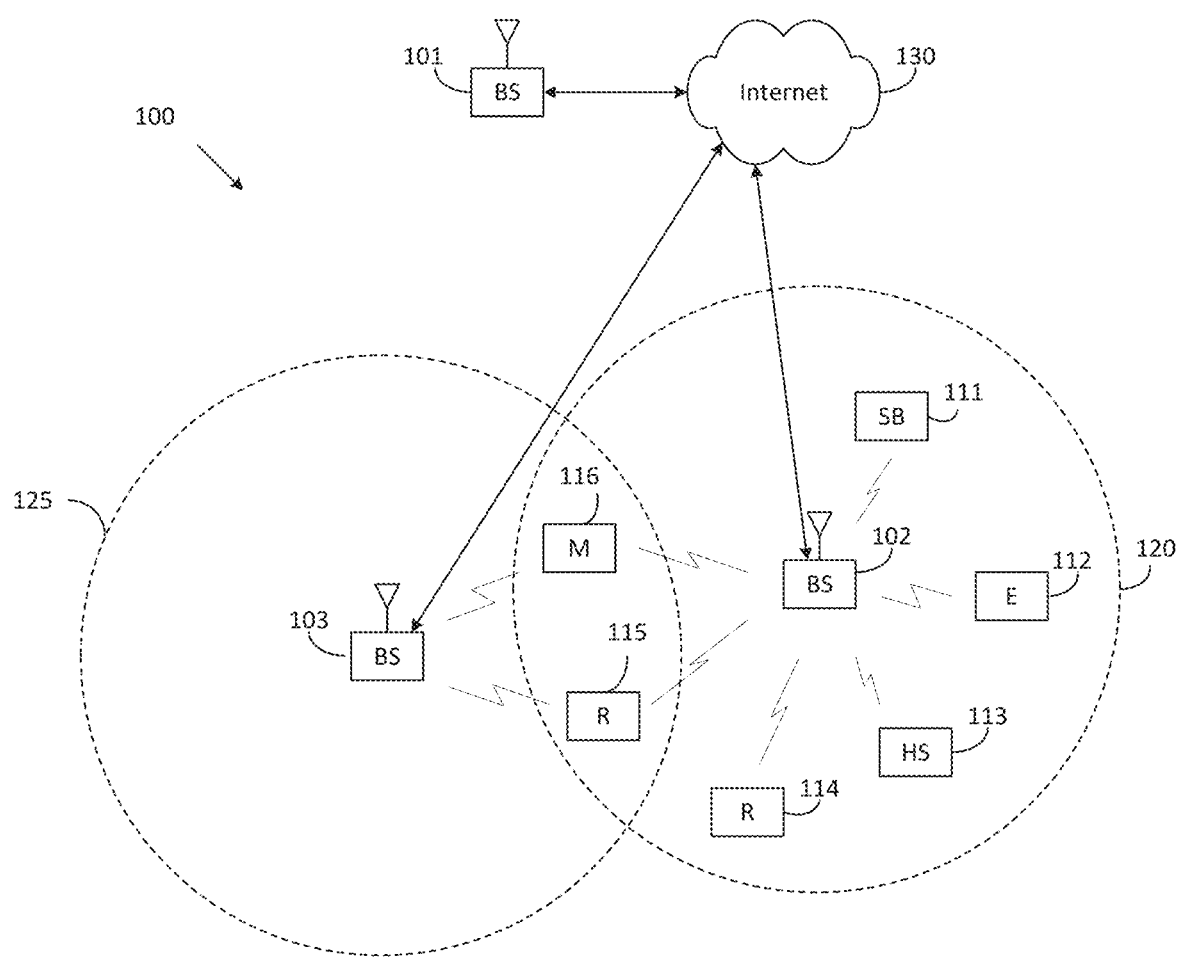
FIG. 1 illustrates an example wireless network according to embodiments of the present disclosure.
Figure 2:
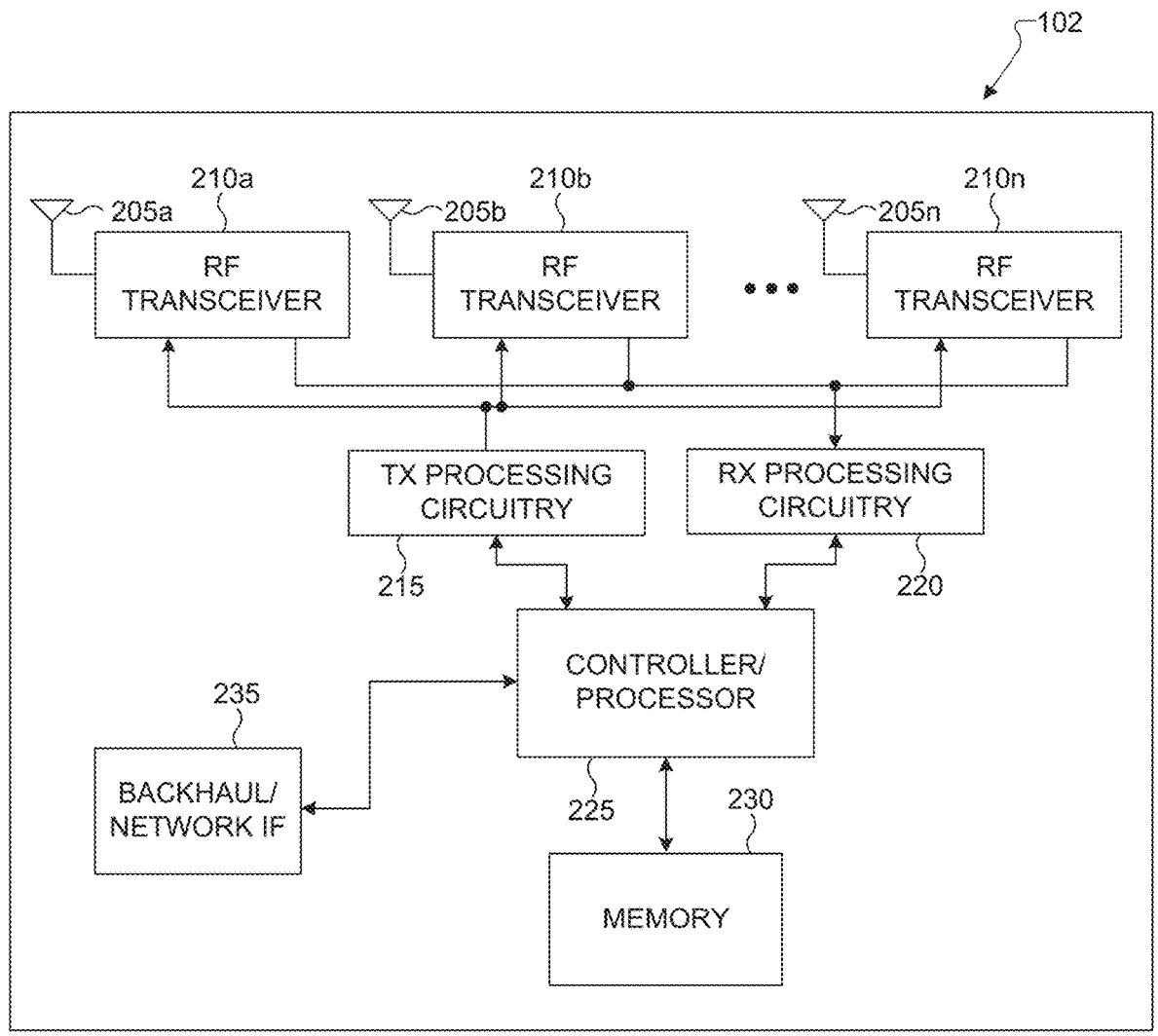
FIG. 2 illustrates an example gNB according to embodiments of the present disclosure.
Figure 3:
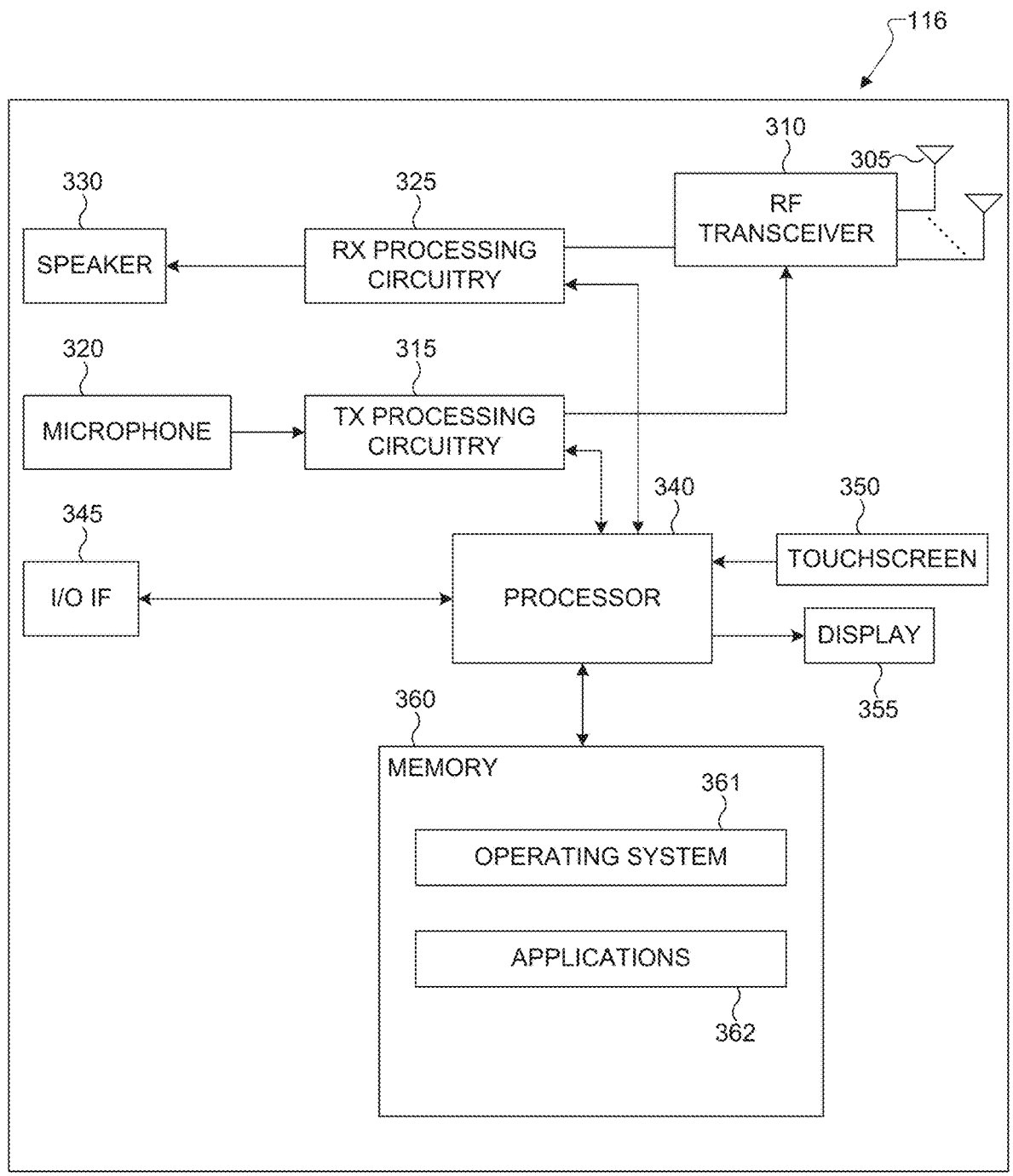
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for UE assistance information report for SIB based cell changes in NTN. In certain embodiments, and one or more of the gNBs 101-103 includes circuitry, programing, or a combination thereof, for beam management and coverage enhancements for SIB based cell changes in NTN. Further, the network 100 could be an NTN in which one or more of the gNBs 101-103 are replaced by or receive network access via a non-terrestrial node such as a satellite.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection (e.g., a wireless network link including a non-terrestrial node). When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support the SIB based cell changes in NTN. For example, the gNB 102 may be or may receive network access via a non-terrestrial node such as a satellite. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330

(such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for an SIB based cell changes in NTN. For example, in various embodiments, the UE 116 may communicate directly or indirectly with a non-terrestrial node such as a satellite. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
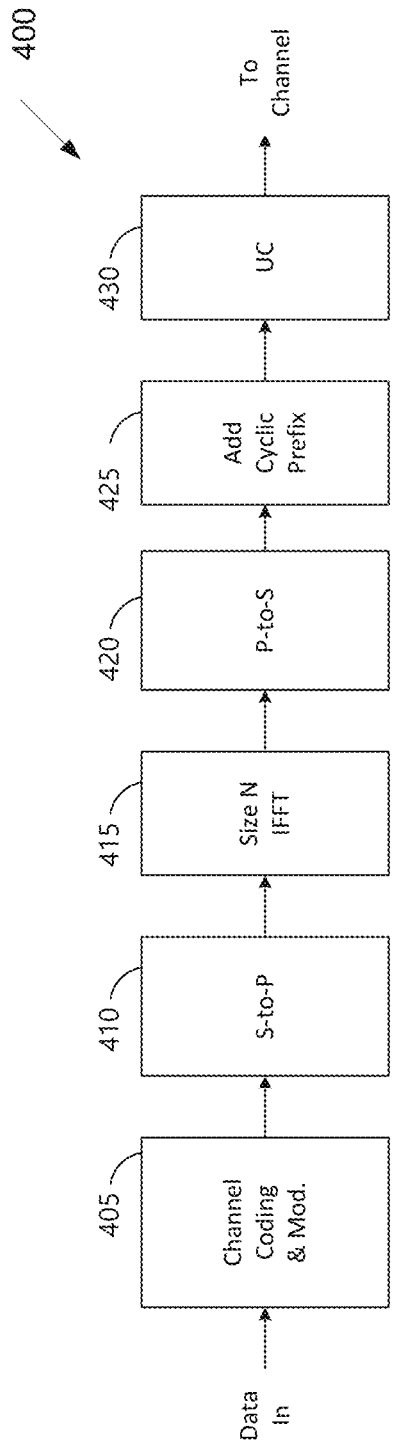
FIGS. 4 and 5 illustrate example wireless transmit and receive paths according to this disclosure.
Figure 5:
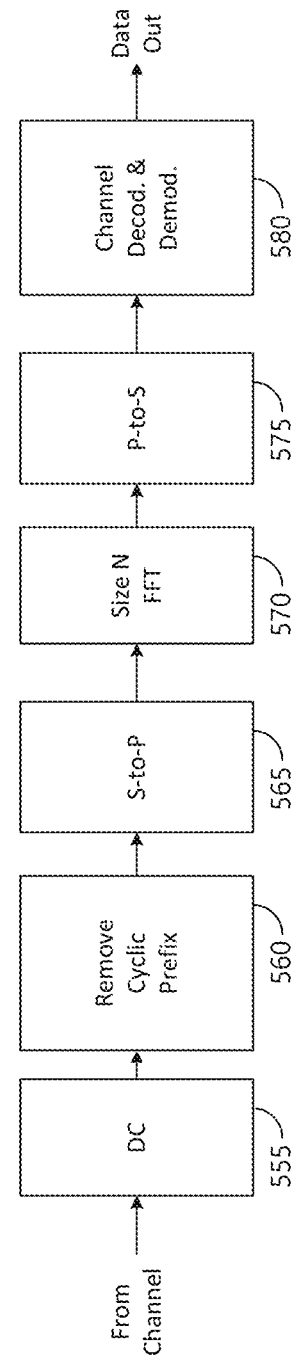

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support SIB based cell changes in NTN as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
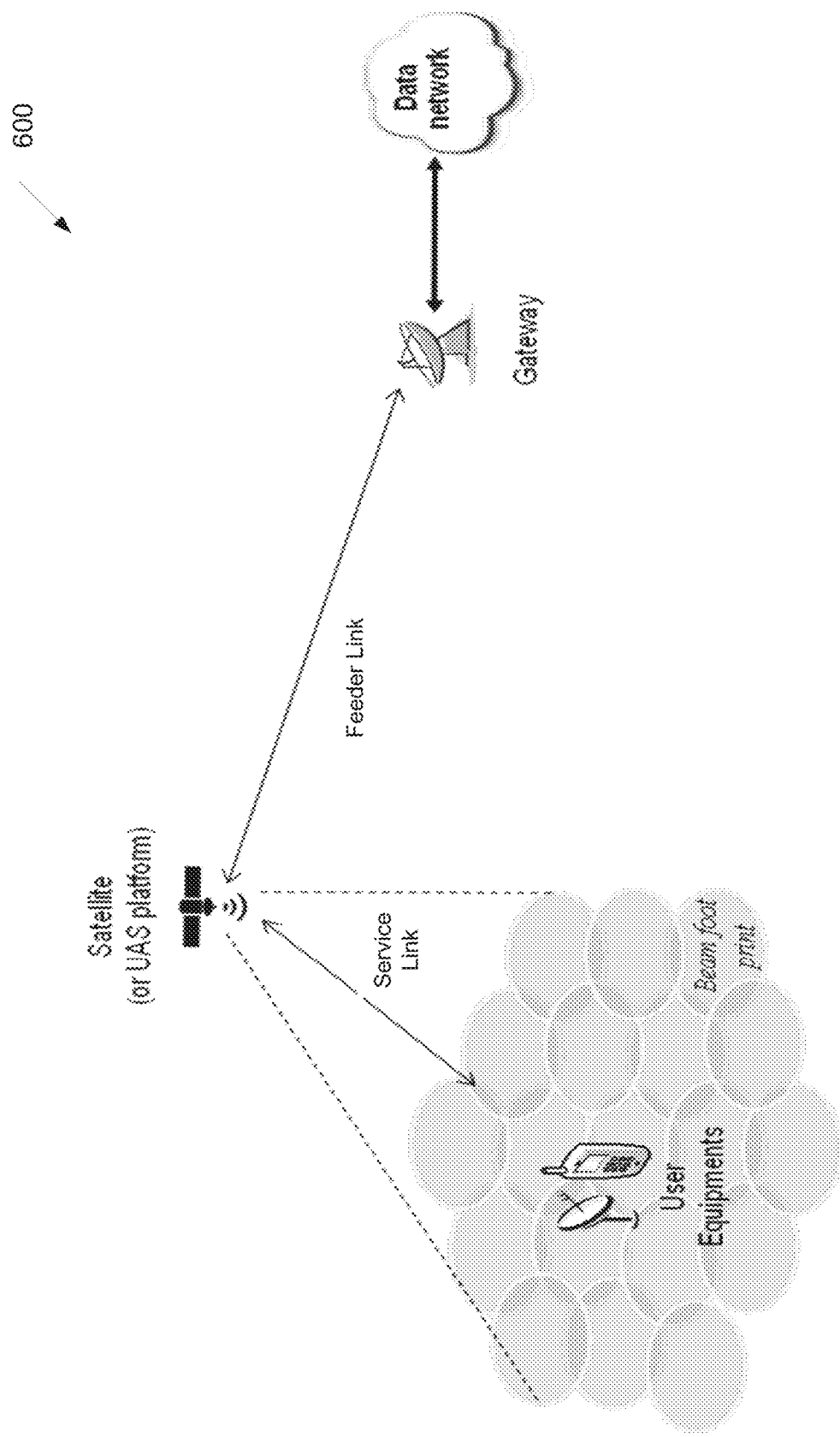
FIG. 6 illustrates an example NTN communication according to embodiments of the present disclosure.

FIG. 6 illustrates an example NTN communication network 600 according to embodiments of the present disclosure. For example, the NTN communication network 600 may be implemented in the network 100 in FIG. 1. An embodiment of the NTN communication network 600 shown in FIG. 6 is for illustration only.

In 3rd generation partnership project (3GPP) wireless standards, a new radio access technology (NR) is discussed as 5G wireless communication technology. One of NR features under the discussion is NTN. An NTN refers to a network, or segment of networks using RF resources on board a satellite (or unmanned aircraft system (UAS) platform) as shown in FIG. 6.

NTN typically features the following elements: (1) one or several satellite-gateways that connect the Non-Terrestrial Network to a public data network; (2) a GEO satellite fed by one or several satellite-gateways which are deployed across the satellite targeted coverage (e.g., regional or even continental coverage). It may be assumed that a UE in a cell is served by only one satellite-gateway; (3) a non-GEO satellite served successively by one or several satellite-gateways at a time. The system ensures service and feeder link continuity between the successive serving satellite-gateways with sufficient time duration to proceed with mobility anchoring and hand-over; (4) a feeder link or radio link between a satellite-gateway and the satellite (or UAS platform); (5) a service link or radio link between the user equipment and the satellite (or UAS platform); (6) a satellite (or UAS platform) which may implement either a transparent or a regenerative (with on board processing) payload. The satellite (or UAS platform) generates beams typically generate several beams over a given service area bounded by the field of view. The footprints of the beams are typically of elliptic shape. The field of view of a satellite (or UAS platform) depends on the on-board antenna diagram and min elevation angle; (7) a transparent payload: radio frequency filtering, Frequency conversion and amplification. Hence, the waveform signal repeated by the payload is un-changed; (8) a regenerative payload: radio frequency filtering, Frequency conversion and amplification as well as demodulation/decoding, switch and/or routing, coding/modulation. This is effectively equivalent to having all or part of base station functions (e.g., gNB) on board the satellite (or UAS platform); (9) inter-satellite links (ISL) optionally in case of a constellation of satellites. This may require regenerative payloads on board the satellites. ISL may operate in RF frequency or optical bands; and/or (10) UEs are served by the satellite (or UAS platform) within the targeted service area.

Figure 7:
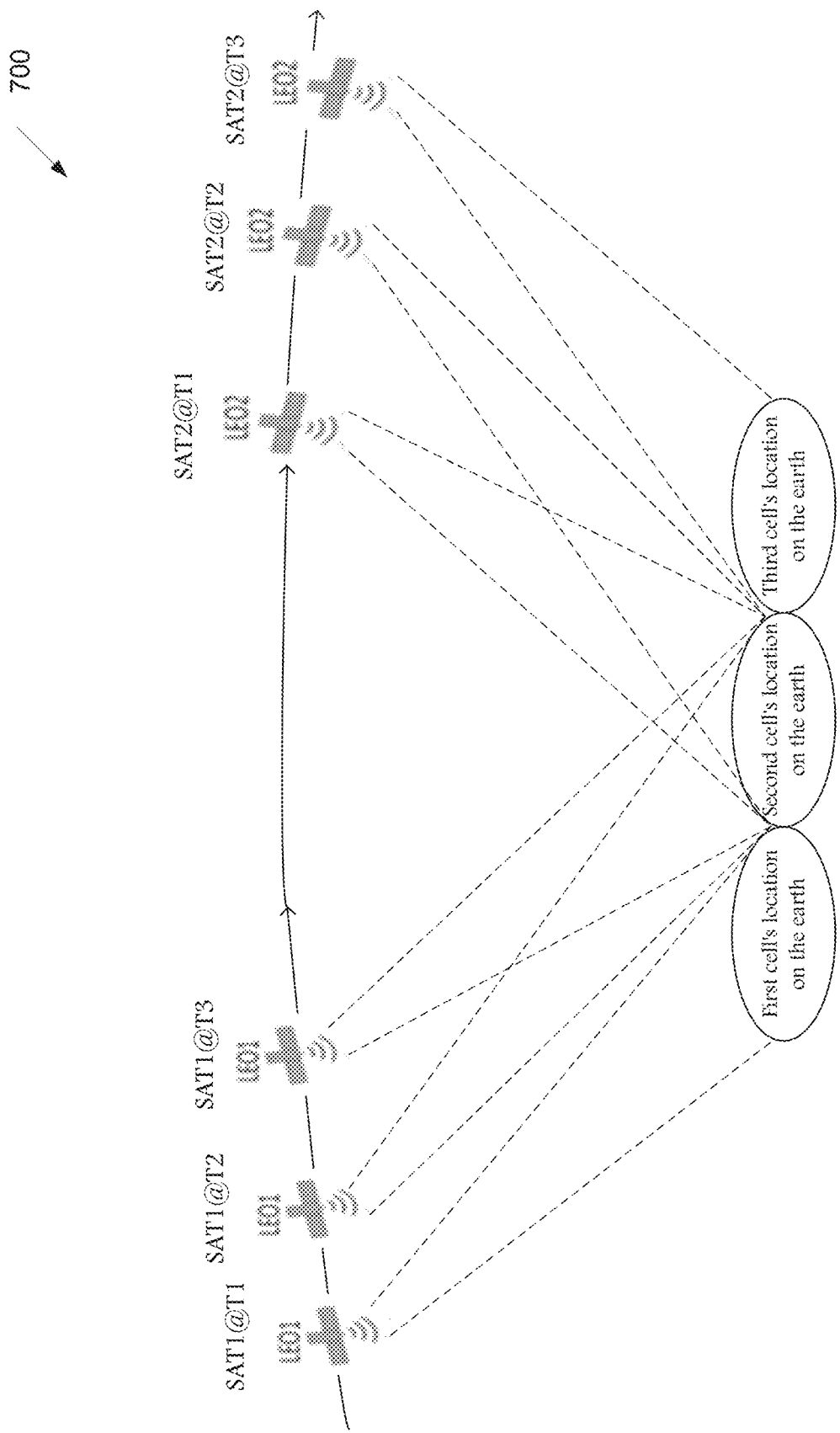
FIG. 7 illustrates an example NTN cell according to embodiments of the present disclosure.

FIG. 7 illustrates an example NTN cell 700 according to embodiments of the present disclosure. For example, the NTN cell 700 may be implemented in a cell of the network 100 in FIG. 1. An embodiment of the NTN cell 700 shown in FIG. 7 is for illustration only.

FIG. 7 illustrates one example of how NTN provides cells fixed with respect to a certain location on the earth during a certain time duration. This can be achieved with NTN platforms generating steerable beams which footprint is fixed on the ground. Satellite1 (SAT1) (here it is also called as low-earth orbit 1 (LEO-1) and satellite2 (SAT2) (here it is also called as LEO2) are moving from the west to east direction. T1, T2, and T3 are certain consecutive time duration (e.g., T1 is between absolute time t1 to t2, T2 is between absolute time t2 to t3, and T3 is between absolute time t3 to t4).

During T1 duration, SAT1 provides NR service to the first cell's location on the earth and SAT2 provides NR service to the second cell's location on the earth. During T2 duration, both SAT1 and SAT2 provide NR service to the second cell's location on the earth. Note that the physical cell ID (physical cell id is also called as PCI here) of the second cell's location on the earth by SAT1 and SAT2 can be different, which means the second cell's location on the earth is covered by two PCIs and each PCI and the associated NR service are provided by each satellite (e.g., SAT1 and SAT2). For instance, during T2 duration the second cell's location on the earth is served by PCI #N by SAT1 while the second cell's location on the earth is served by PCI #M by SAT2. However, the PCI #M by SAT2 may be disappeared sooner or late since SAT2 may serve the third cell's location on the earth during the following T3 duration. Therefore, during T2 duration an efficient mechanism to move UEs served by PCI #M by SAT2 into PCI #N by SAT1 needs to be introduced.

Figure 8:
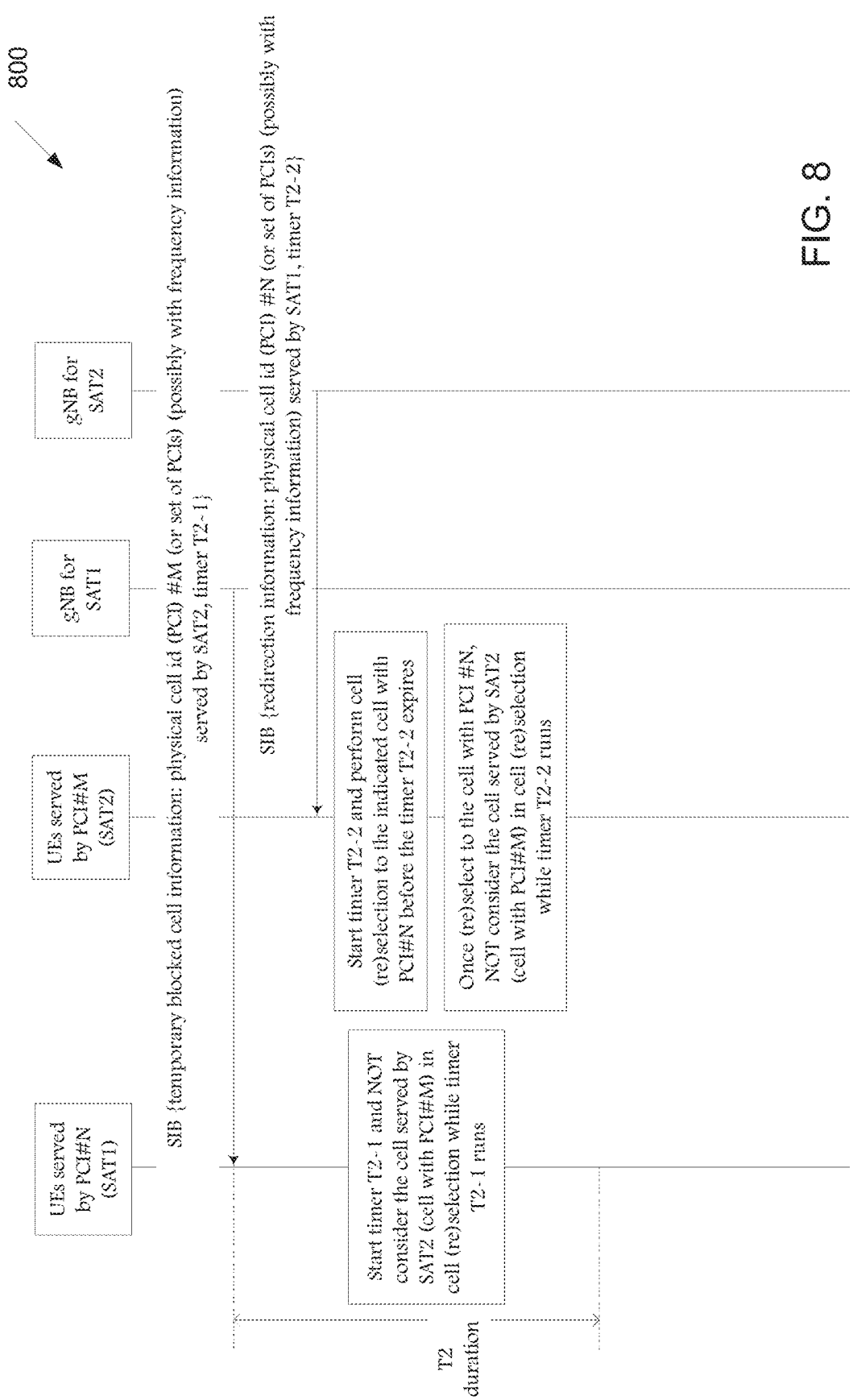
FIG. 8 illustrates an example signaling flow for enhanced cell (re)selection according to embodiments of the present disclosure.

FIG. 8 illustrates an example signaling flow 800 for enhanced cell (re)selection according to embodiments of the present disclosure. For example, the signaling flow 800 as may be performed by a UE such as 111-116 and a BS such as 101-103 as illustrated in FIG. 1. An embodiment of the signaling flow 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

FIG. 8 illustrates an example of signaling flows to the provided mechanism. As illustrated in FIG. 8, when T2 duration comes, a gNB for SAT1 and a gNB for SAT2 provide assistance information to the UE located in the cell with its own PCI. The gNB for SAT1 provides temporary blocked cell information. The information includes physical cell ID information (possibly with the frequency information) and timer information. Once the UEs served by SAT1 receive that information, the UEs start the indicated timer and the UEs do not consider the cell with the indicated PCI (possibly on the indicated frequency) in the cell (re)selection while the indicated timer runs. If the indicated timer expires, the UEs come back to the normal cell (re)selection procedure. For example, based on the example described in FIG. 7, if a gNB for SAT1 provides the temporary blocked cell information including PCI #M (served by SAT2) and timer T2-1 to the UEs in the cell served by SAT1, the UEs start timer T2-1 and do not consider the cell with PCI #M in the same frequency (intra-frequency) in the cell (re)selection while timer T2-1 runs.

Note that if frequency information is included, it may be assumed that the cell with PCI #M in the indicated frequency (inter-frequency) in the cell (re)selection while timer T2-1 runs. Although FIG. 7 illustrates an example that this information is provided by SIB, but it can be also signaled by other than SIB, for example by dedicated RRC signaling, common physical control signaling, or MAC control information, etc. If timer T2-1 expires, the UEs back to the normal cell (re)selection procedure without the restriction.

The gNB for SAT2 provides redirection information. The information includes physical cell ID information (possibly with the frequency information) and timer information.

Once the UEs served by SAT2 receive that information, the UEs start the indicated timer, the UEs perform cell (re)selection to the cell with the indicated physical cell ID before the timer expires, and once the UEs (re)select (or camp on) the cell the UEs do not consider the previous serving cell (the cell where the UE received the redirection information) in the cell (re)selection while the indicated timer runs. If the indicated timer expires, the UEs come back to the normal cell (re)selection procedure.

For example, based on the example described in FIG. 7, if a gNB for SAT2 provides the redirection information including PCI #N (served by SAT1) and timer T2-2 to the UEs in the cell served by SAT2, the UEs start timer T2-2, perform cell (re)selection to the cell with PCI #N before the timer T2-2 expires, and once the UEs (re)select (or camp on) the cell with PCI #N the UEs do not consider the previous serving cell with PCI #M in the previous frequency (the cell and the frequency where the UEs received the redirection information) in the cell (re)selection while the timer T2-2 runs.

Although FIG. 7 illustrates an example that this information is provided by SIB, but it can be also signaled by other than SIB, for example by dedicated RRC signaling, common physical control signaling, or MAC control information, etc. If timer T2-2 expires, the UEs back to the normal cell (re)selection procedure without the restriction.

Note that if timers 2-1 and 2-2 are same, timer T2-2 can be absent in the signaling provided by a gNB for SAT2. In this case, once the UEs (re)select (or camp on) the cell with PCI #N, T2-1 provided by gNB for SAT1 can be used for the purpose of timer T2-2. Also note although the example of FIG. 8 is described based on the single cell in the signaling provided by the gNB for SAT1 and the gNB for SAT2, multiple cells can be included in the signaling provided by the gNB for SAT1 and the gNB for SAT2 and in this case, the UEs served by the gNB for SAT1 do not consider the indicated multiple cells in the cell (re)selection while timer T2-1 runs and the UEs served by the gNB for SAT2 can perform cell (re)selection to any of the indicated multiple cells when the UEs received the redirection information.

Also note although the example of FIG. 8 is described based on the timer (e.g., timer T2-1 and T2-2), instead of timers absolute timing information can be signaled and used. In the case, the UE has GNSS capability so the UE knows when the indicated absolute timing information is. If an absolute timing information #3-1 (replacing the timer T2-1) is signaled, the UEs served by PCI #N (SAT1) do not consider the cell with PCI #M in the cell (re)selection if the current time is (equal or) before the time indicated by the absolute timing information #3-1. The UEs can consider the cell with PCI #M in the cell (re)selection if the current time is (equal or) after the time indicated by the absolute timing information #3-1. If an absolute timing information #3-2 (replacing the timer T2-2) is signaled, the UEs served by PCI #M (SAT2) performs cell (re)selection to the indicated cell with PCI #N before the time indicated by the absolute timing information #3-2, and once the UEs (re)select (or camp on) the cell with PCI #N the UEs do not consider the previous serving cell with PCI #M where the UE received the redirection information in the cell (re)selection if the current time is (equal or) before the time indicated by the absolute timing information #3-2. The UEs can consider the previous serving cell with PCI #M in the cell (re)selection if the current time is (equal or) after the time indicated by the absolute timing information #3-2. Note that if the absolute timing information #3-1 and the absolute timing information #3-2 are same, the absolute timing information #3-2 can be absent in the signaling provided by a gNB for SAT2. In this case, once the UEs (re)select (or camp on) the cell with PCI #N, the absolute timing information #3-1 provided by gNB for SAT1 can be used for the purpose of the absolute timing information #3-2.

Figure 9:
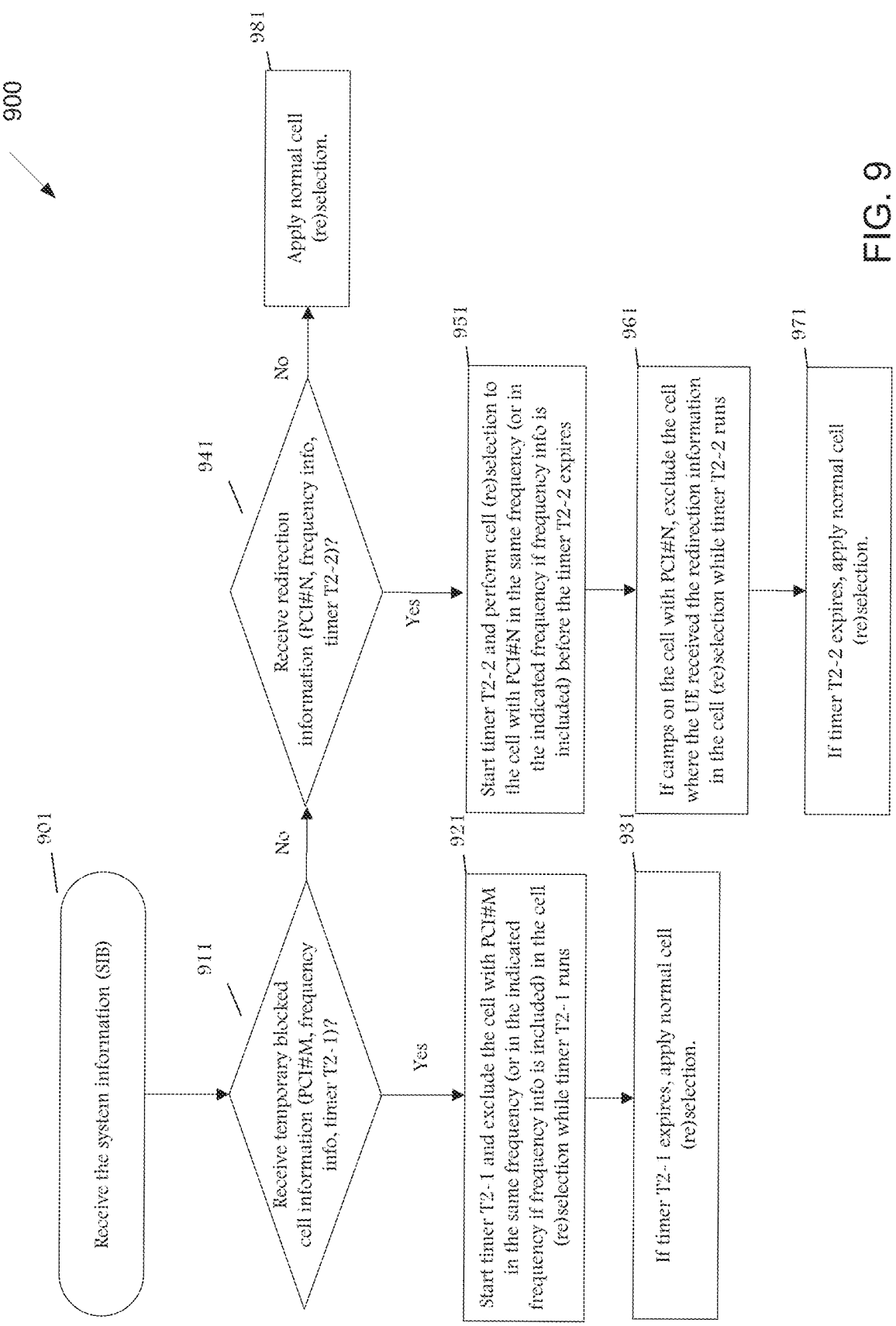
FIG. 9 illustrates a flowchart of a method for UE behavior according to embodiments of the present disclosure.

FIG. 9 illustrates a flowchart of a method 900 for UE behavior according to embodiments of the present disclosure. For example, the method 900 as may be performed by a UE such as 111-116 as illustrated in FIG. 1. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 illustrates an example of the corresponding UE behaviors. The UE receives the system information (or SIB) in the serving cell (step 901). If the UE receives temporary blocked cell information in the received system information (or SIB) including PCI information (e.g., PCI #M), frequency information and timer information (e.g., timer T2-1), the UE starts timer T2-1 and excludes the cell with PCI #M in the same frequency (if frequency information is not included) or in the indicated frequency (if frequency information is included) in the cell (re)selection while timer T2-1 runs (step 911 and step 921).

If timer T2-1 expires, the UE applies normal cell (re) selection (step 931). If the UE receives redirection information in the received system information (or SIB) including PCI information (e.g., PCI #N), frequency information and timer information (e.g., timer T2-2), the UE starts timer T2-2 and performs cell (re)selection to the cell with PCI #N in the same frequency (if frequency information is not included) or in the indicated frequency (if frequency information is included) before the timer T2-2 expires (step 941 and step 951).

This cell (re)selection can be done based on the measured radio channel conditions (as defined in 3GPP standard such as TS 38.304) or based on the new criterion to be introduced for NTN. As new criterion, for example, in order to (re) select the cell, configured minimum (or maximum) propagation delay between the satellite and the UE (given the satellite location related information is provided by system information and the UE location information is provided by its own GNSS) may be met, or configured minimum (or maximum) distance between the reference point and the UE (given the reference point related information is provided by system information and the UE location information is provided by its own GNSS) may be met, or configured minimum (or maximum) UL timing advanced between the satellite and the UE (or between the gNB for the satellite and the UE) (given the satellite location/gNB location related information is provided by system information and the UE location information is provided by its own GNSS) may be met.

As a result of cell (re)selection, if the UE camps on the cell with PCI #N, the UE excludes the cell where the UE received the redirection information in the cell (re)selection while timer T2-2 runs (step 961). If the timer T2-2 expires, the UE applies normal cell (re)selection (step 971). If the UE does not receive any of temporary blocked cell information or redirection information, the UE applies normal cell (re) selection (step 981).

The PCI #M by SAT2 may be disappeared sooner or late since SAT2 may serve the third cell's location on the earth during the following T3 duration. At T3, if SAT2 switches serving location from the second cell's location to the third cell's location on the earth, all UEs located in the second cell's location on the earth that served by SAT2 may perform cell (re)selection to the cell served by SAT1. That may bring the significant congestion issues since all the massive UEs perform cell (re)selections to the cell served by SAT2 (almost) at the same time, for example at around T3. Therefore, an efficient mechanism is required to enable the UEs to perform cell (re)selection to the new target cell with the avoidance of possible congestion.

Figure 10:
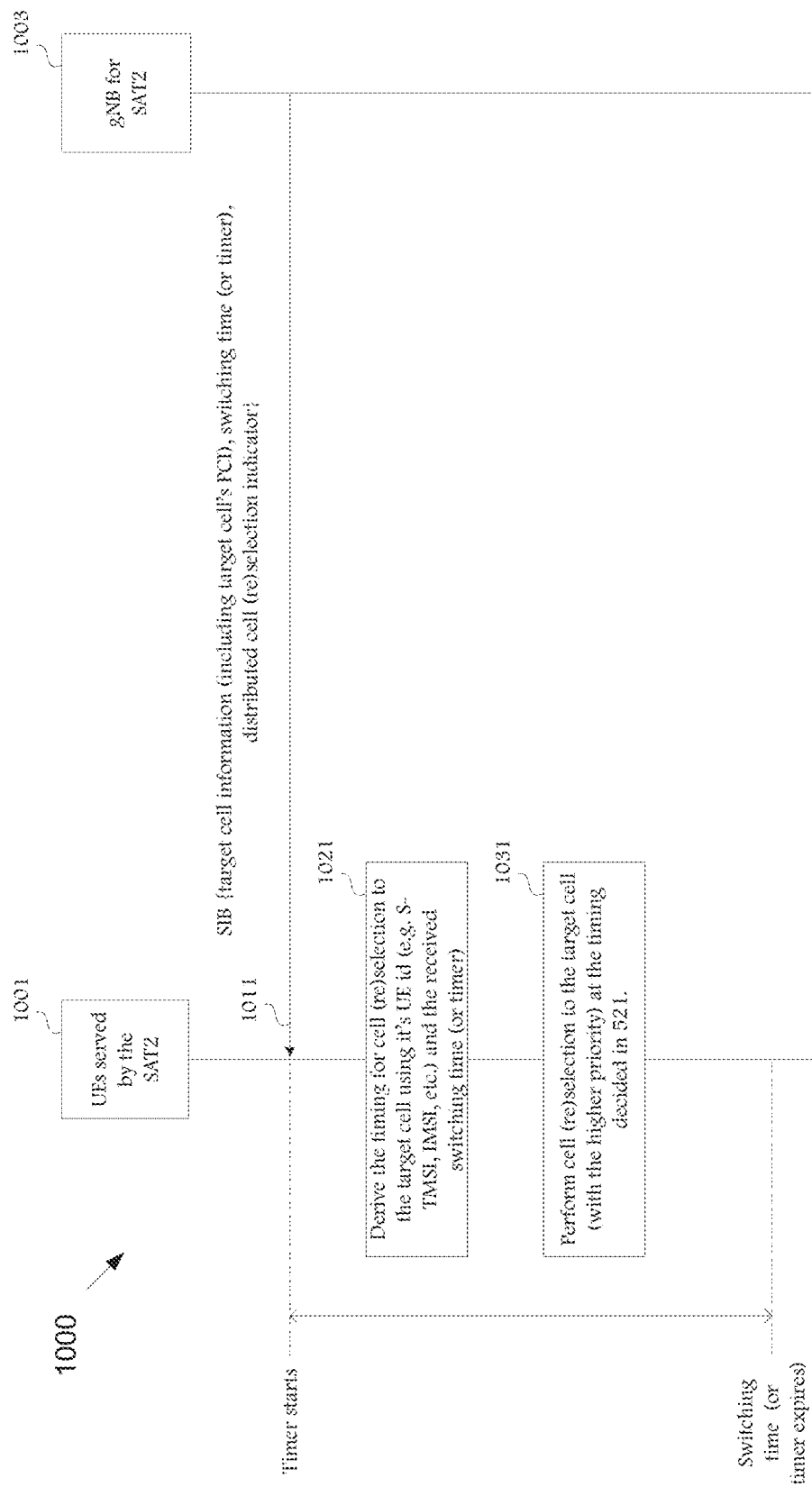
FIG. 10 illustrates another example signaling flow for enhanced cell (re)selection according to embodiments of the present disclosure.

FIG. 10 illustrates another example signaling flow 1000 for enhanced cell (re)selection according to embodiments of the present disclosure. For example, the signaling flow 1000 as may be performed by a UE such as 111-116 and a BS such as 101-103 as illustrated in FIG. 1. An embodiment of the signaling flow 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

FIG. 10 illustrates an example of signaling flows to the provided cell (re)selection mechanism. As illustrated in FIG. 10, a gNB for SAT2 (step 1003) provides an assistance information to the UEs located in the second cell's location on the earth (step 1001) before T3 comes. The assistance information includes target cell information (including the target cell's PCI, etc.), switching time (or timer as an alternative), and distributed cell (re)selection indicator (step 1011).

Note that, at step 1011, information can be sent to the UEs by SIB. If distributed cell (re)selection indicator is set, the UE performs cell (re)selection to the indicated target cell according to the steps 1021 and step 1031. Otherwise, the UE performs cell (re)selection to the indicated target cell at the indicated switching time. Target cell's PCI indicates the PCI of the next cell, which may mainly serve the UEs in the corresponding location on the earth after the indicated switching time (or the indicated timer expires).

For example, in the described scenario in FIG. 7 if the switching time indicates T3, the target cell's PCI indicates the SAT1's PCI on the second cell's location on the earth, which may mainly serve the UEs in the second cell's location after the switching time. Switching time indicates the timing when the current serving cell may be disappeared in the corresponding cell location on the earth and the new incoming cell may become the new serving cell to the UEs in that location. Thus, the UEs in the location may perform cell (re)selection to the new target cell at switching time at the latest. Note that switching time can be provided as either absolute timing information (e.g., GPS timing, absolute the number of units passed from the reference timing, etc.) or as a timer (e.g., timer value that is relative to message receipt or some other indicated time).

It may be assumed that the distributed cell (re)selection indicator is set. Then the UE derives the timing for cell (re)selection to the target cell using the UE ID (for example, UE's s-temporary mobile subscription identifier (S-TMSI) or international mobile subscriber identity (IMSI), etc.) and the received switching time (or the timer) (step 1021).

Note that S-TMSI is a temporary UE identity provided by the core network which uniquely identifies the UE within the tracking area as introduced in 3GPP standard specification, TS 23.003. Also note that 5G-S-TMSI for NR (5GC) specific S-TMSI is considered. One example to derive the timing for cell (re)selection to the target cell may be: (1) a UE first calculates the total number of slots (or any other timing unit terms) until the switching time (e.g., M slots); and (2) the UE calculates the value of {UE id MOD M} (let's call N value), then the timing to perform cell (re) selection to the target cell is after N slots may be passed. Note that if a timer is provided in step 1011, the UE first calculates the total number of slots (or any other timing unit terms) corresponding to the indicated timer value in (1) as described above.

Another example to derive the timing for cell (re)selection to the target cell may be just random selection of timing during the time period until the switching time (or until timer expires if the timer is provided in step 1011).

Note that if a timer is provided in step 1011, the UE starts the timer when the UE receives at step 1011. Once the timing for cell (re)selection to the target cell is determined in step 1021, the UE performs cell (re)selection to the target cell at the timing determined in step 1021 (e.g., step 1031). When the UE performs cell reselection to the target cell, the UE can consider that the target cell has higher cell reselection priority than the other cells in cell reselection even in the case the current serving cell and the target cell are on the same frequency.

With the higher cell reselection priority, the UE can camp on the target cell if the measurement results for the target cell meets the threshold configured by the gNB (for example, if the target cell's measured result is better than the threshold configured by the gNB).

Note that although it is not described in FIG. 10, at step 1011 may include the corresponding threshold information for cell reselection to the cell with the higher priority in the same frequency (e.g., a cell reselection in the same frequency may be considered as intra-frequency cell reselection).

Although it is not illustrated in FIG. 10, as another example, step 1011 can also include the starting time for cell reselection to the indicated target cell. In the case, at step 1021, the UE considers total number of slots (or any other timing unit terms) between the indicated starting time and the switching time and the timing to perform cell (re) selection to the target cell is after N slots may be passed from the indicated starting time. And if a timer is provided in step 1011, the UE starts the timer at the indicated starting time for cell (re)selection to the target cell.

If the distributed cell (re)selection indicator is not set in step 1011, the UE performs cell (re)selection to the target cell at the indicated switching time (or the indicated timer expires. Note that if the timer is included in step 1011, the UE starts the timer when step 1011 is received).

When the UE performs cell reselection to the target cell, the UE can consider the target cell has higher cell reselection priority than the other cells in cell reselection even in the case the current serving cell, the target cell and other cells are on the same frequency (it is also called intra-frequency cell reselection). With the higher cell reselection priority, the UE can camp on the target cell if the measurement results for the target cell meets the threshold configured by the gNB (for example, if the target cell's measured result is better than the threshold configured by the gNB).

Note that although it is not illustrated in FIG. 10, step 1011 may include the corresponding threshold information for cell reselection to the cell with the higher cell reselection priority in intra-frequency cell reselection.

Figure 11:
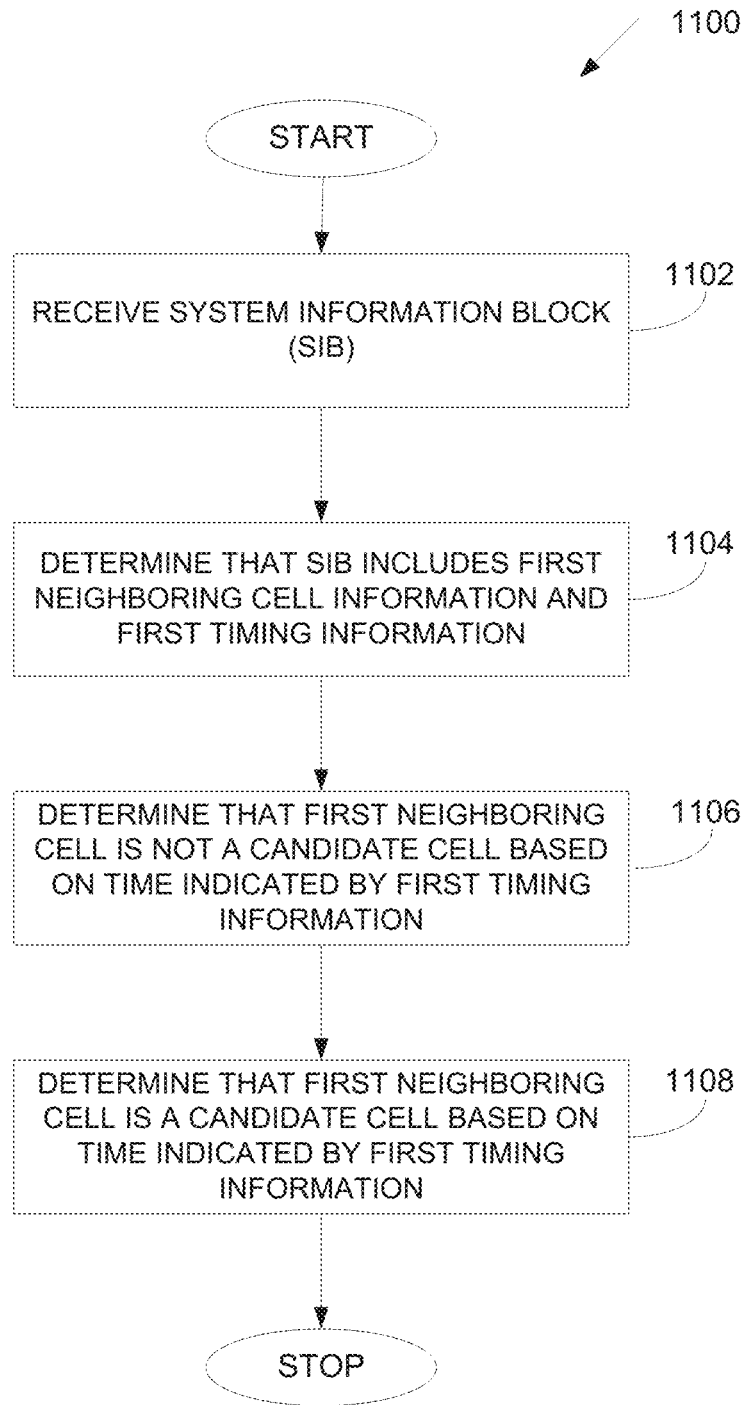
FIG. 11 illustrates a flow chart of a method for a SIB based cell changes according to embodiments of the present disclosure.

FIG. 11 illustrates a flow chart of a method 1100 for a SIB based cell changes according to embodiments of the present disclosure. For example, the method 1100 as may be performed by a UE such as 111-116 as illustrated in FIG. 1. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, the method 1100 begins at step 1102. In step 1102, a UE receives, from a BS in an NTN, an SIB.

Subsequently, in step 1104, the UE determines that the SIB includes first neighboring cell information and first timing information associated therewith.

Next, in step 1106, the UE determines that a first neighboring cell is not a candidate cell for a cell selection or re-selection operation when a current time is before or equal to a time indicated by the first timing information.

In one embodiment, the time is indicated by the first timing information via a timer or an absolute time and the time indicates a timing instance when the first neighboring cell stops serving an area.

In one embodiment, the first neighboring cell information includes a first physical cell identifier (PCI), first frequency information of the first neighboring cell, and information associated with the first timing information. In such embodiment, the first frequency information is omitted when a first frequency included in the first frequency information is a frequency that is same as a frequency of a serving cell.

Finally, in step 1108, the UE determines that the first neighboring cell is a candidate cell for the cell selection or re-selection operation when the current time is after the time indicated by the first timing information.

In one embodiment, the UE further determines whether the SIB includes redirection information and performs the cell selection or re-selection operation to a second neighboring cell based on a determination that the SIB includes the redirection information.

In such embodiment, the redirection information includes a second PCI, second frequency information of the second neighboring cell, and information associated with second timing information. In such embodiment, the second frequency information is omitted when a second frequency included in the second frequency information is a frequency that is same as a frequency of a serving cell.

In such embodiment, the second timing information indicates a second time via a timer or an absolute time and the second time indicates a timing instance when the serving cell stops serving an area.

In one embodiment, the UE further performs the cell selection or re-selection operation to the second neighboring cell when a current time is before or equal to a time indicated by second timing information and determines that, when the UE camps on the second neighboring cell, a previous serving cell is not a candidate cell for the cell selection or re-selection operation when the current time is before or equal to the time indicated by the second timing information.

In one embodiment, the UE further determines that the previous serving cell is a candidate cell for the cell selection or re-selection operation when the current time is after the time indicated by the second timing information.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
   a transceiver configured to receive, from a base station (BS) in a non-terrestrial network (NTN), a system information block (SIB); and
   a processor operably coupled to the transceiver, the processor configured to:
      determine that the SIB includes first neighboring cell information and first timing information associated therewith;
      determine that a first neighboring cell is not a candidate cell for a cell selection or re-selection operation when a current time is before or equal to a time indicated by the first timing information; and
      determine that the first neighboring cell is a candidate cell for the cell selection or re-selection operation when the current time is after the time indicated by the first timing information.

2. The UE of claim 1, wherein:
   the time is indicated by the first timing information via a timer or an absolute time, and
   the time indicates a timing instance when the first neighboring cell stops serving an area.

3. The UE of claim 1, wherein:
   the first neighboring cell information includes a first physical cell identifier (PCI), first frequency information of the first neighboring cell, and information associated with the first timing information; and
   the first frequency information is omitted when a first frequency included in the first frequency information is a frequency that is same as a frequency of a serving cell.

4. The UE of claim 1, wherein the processor is further configured to:
   determine whether the SIB includes redirection information; and
   perform the cell selection or re-selection operation to a second neighboring cell based on a determination that the SIB includes the redirection information.

5. The UE of claim 4, wherein:
   the redirection information includes a second PCI, second frequency information of the second neighboring cell, and information associated with second timing information; and
   the second frequency information is omitted when a second frequency included in the second frequency information is a frequency that is same as a frequency of a serving cell.

6. The UE of claim 5, wherein:
   the second timing information indicates a second time via a timer or an absolute time; and
   the second time indicates a timing instance when the serving cell stops serving an area.

7. The UE of claim 4, the processor is further configured to:
   perform the cell selection or re-selection operation to the second neighboring cell when a current time is before or equal to a time indicated by second timing information; and
   determine that, when the UE camps on the second neighboring cell, a previous serving cell is not a candidate cell for the cell selection or re-selection operation when the current time is before or equal to the time indicated by the second timing information.

8. The UE of claim 7, wherein the processor is further configured to determine that the previous serving cell is a candidate cell for the cell selection or re-selection operation when the current time is after the time indicated by the second timing information.

9. A method of a user equipment (UE), the method comprising:
   receiving, from a base station (BS) in a non-terrestrial network (NTN), a system information block (SIB);
   determining that the SIB includes first neighboring cell information and first timing information associated therewith;
   determining that a first neighboring cell is not a candidate cell for a cell selection or re-selection operation when a current time is before or equal to a time indicated by the first timing information; and
   determining that the first neighboring cell is a candidate cell for the cell selection or re-selection operation when the current time is after the time indicated by the first timing information.

10. The method of claim 9, wherein:
    the time is indicated by the first timing information via a timer or an absolute time; and
    the time indicates a timing instance when the first neighboring cell stops serving an area.

11. The method of claim 9, wherein:
    the first neighboring cell information includes a first physical cell identifier (PCI), first frequency information of the first neighboring cell, and information associated with the first timing information; and
    the first frequency information is omitted when a first frequency included in the first frequency information is a frequency that is same as a frequency of a serving cell.

12. The method of claim 9, further comprising:
determining whether the SIB includes redirection information; and
performing the cell selection or re-selection operation to a second neighboring cell based on a determination that the SIB includes the redirection information.

13. The method of claim 12, wherein:
the redirection information includes a second PCI, second frequency information of the second neighboring cell, and information associated with second timing information; and
the second frequency information is omitted when a second frequency included in the second frequency information is a frequency that is same as a frequency of a serving cell.

14. The method of claim 13, wherein:
the second timing information indicates a second time via a timer or an absolute time; and
the second time indicates a timing instance when the serving cell stops serving an area.

15. The method of claim 12, further comprising:
performing the cell selection or re-selection operation to the second neighboring cell when a current time is before or equal to a time indicated by second timing information; and
determining that, when the UE camps on the second neighboring cell, a previous serving cell is not a candidate cell for the cell selection or re-selection operation when the current time is before or equal to the time indicated by the second timing information.

16. The method of claim 15, further comprising determining that the previous serving cell is a candidate cell for the cell selection or re-selection operation when the current time is after the time indicated by the second timing information.

17. A base station (BS) in a non-terrestrial network (NTN), the BS comprising:
a processor configured to generate a system information block (SIB) including first neighboring cell information and first timing information associated therewith; and
a transceiver operably coupled to the processor, the transceiver configured to transmit, to a user equipment (UE), the SIB,
wherein:
a first neighboring cell is not determined as a candidate cell for a cell selection or re-selection operation when a current time is before or equal to a time indicated by the first timing information; and
the first neighboring cell is determined as a candidate cell for the cell selection or re-selection operation when the current time is after the time indicated by the first timing information.

18. The BS of claim 17, wherein:
the first neighboring cell information includes a first physical cell identifier (PCI), first frequency information of the first neighboring cell, and information associated with the first timing information; and
the first frequency information is omitted when a first frequency included in the first frequency information is a frequency that is same as a frequency of a serving cell.

19. The BS of claim 17, wherein:
the processor is further configured to generate the SIB including redirection information;
the redirection information includes a second PCI, second frequency information of the second neighboring cell, and information associated with second timing information; and
the second frequency information is omitted when a second frequency included in the second frequency information is a frequency that is same as a frequency of a serving cell.

20. The BS of claim 19, wherein:
the second timing information indicates a second time via a timer or an absolute time; and
the second time indicates a timing instance when the serving cell stops serving an area.

* * * * *